US007899762B2

(12) United States Patent
Iyengar et al.

(10) Patent No.: US 7,899,762 B2
(45) Date of Patent: Mar. 1, 2011

(54) APPARATUS, METHOD, AND COMPUTER PROGRAM PRODUCT PROVIDING IMPROVED IDENTIFICATION OF SUSPECT ENTRIES IN TRANSACTION DATA

(75) Inventors: Vijay Sourirajan Iyengar, Cortlandt Manor, NY (US); Ioana Boier-Martin, Pelham Manor, NY (US); Karen A. Kelley, Newtown, CT (US); Raymond Anthony Curatolo, New Milford, CT (US)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 11/749,866

(22) Filed: May 17, 2007

(65) Prior Publication Data
US 2008/0288424 A1 Nov. 20, 2008

(51) Int. Cl.
*G06F 15/18* (2006.01)
*G06E 3/00* (2006.01)
(52) U.S. Cl. .............................. 706/12; 706/14; 706/20
(58) Field of Classification Search ...................... None
See application file for complete search history.

(56) References Cited

U.S. PATENT DOCUMENTS

| 6,029,144 | A | 2/2000 | Barrett et al. | 705/30 |
| 6,643,625 | B1 | 11/2003 | Acosta et al. | 705/38 |
| 2005/0160340 | A1 | 7/2005 | Abe et al. | 714/746 |
| 2006/0285665 | A1* | 12/2006 | Wasserblat et al. | 379/114.14 |
| 2007/0061211 | A1* | 3/2007 | Ramer et al. | 705/25 |

OTHER PUBLICATIONS

Bolton et al., R., "Statistical Fraud Detection: A Review", Statistical Science 17, Jan. 2002.*
Fawcett et al., T., "Activity Monitoring: Noticing interesting changes in behavior", KDD-99, Aug. 15-18, 1999.*

(Continued)

*Primary Examiner*—Michael B. Holmes
*Assistant Examiner*—Adrian L Kennedy
(74) *Attorney, Agent, or Firm*—Harrington & Smith

(57) ABSTRACT

The exemplary embodiments of the invention provide apparatus, systems, methods and computer program products for scoring entities in order to use the scoring for such tasks as identifying and prioritizing those entities that are candidates for further investigation, for example, from an audit or business control perspective. In an exemplary aspect of the invention, a method includes: providing transaction data having a plurality of pieces of information and an identification of a corresponding entity of a plurality of entities, wherein at least one piece of information of the plurality of pieces of information corresponds to each entity of the plurality of entities, wherein the transaction data comprises input data; computing at least one score for each entity of the plurality of entities by applying at least one statistical analysis technique to the input data, wherein the computed at least one score for a tested entity is indicative of at least one of a magnitude of deviation of the tested entity from a determined normal and repeated abnormal behavior of the tested entity; selecting zero or more entities of the plurality of entities by comparing at least one computed score of each entity with a specified threshold, wherein the selected zero or more entities comprise candidates for further investigation; and ordering the selected zero or more entities based on at least one computed score of each entity of the selected zero or more entities.

21 Claims, 4 Drawing Sheets

OTHER PUBLICATIONS

Bolton et al., R., "Unsupervised Profiling Method for Fraud Detection", Credit Scoring and Credit Control VII, 2001.*

Wheeler et al., R., "Multiple algorithms for fraud detection", Knowledge-Based Systems 13, p. 93-99, 2000.*

Chung, I., "Market Choice and Effective Demand for Credit: Roles of Borrower Transaction Costs and Rationing Constraint", Journal of Economic Development, vol. 20, No. 2, pp. 23-44, Dec. 1995.*

Gray et al., P., "Testing Market Efficiency: Evidence from the NFL Sports Betting Market", The Journal of Finance, vol. 52, No. 4, pp. 1725-1737, Sep. 1997.*

Gordon, E., "Accounting for Changing Prices: The Value Relevance of Historical Cost, Price Level, and Replacement Cost Accounting in Mexico", Journal of Accounting Research, vol. 39, No. 1, pp. 177-200, Jun. 2001.*

Jorian, P., "The Pricing of Exchange Rate Risk in the Stock Market", The Journal of Financial and Quantitiative Analysis, vol. 26, No. 3, pp. 363-376, Sep. 1991.*

Viaene et al., "Strategies for Detecting Fraudulent Claims in the Automobile Insurance Industry", Aug. 2005, European Journal of Operational Research, 19 pgs.

Huang et al., "A Spatial Scan Statistic for Survival Data", Mar. 2006, Biometrics, vol. 63, Issue 1, 25 pgs.

Kulldorf, "A Spatial Scan Statistic, Communications in Statistics: Theory and Methods", 1997, 26: 1481-1496.

Dwass, "Modified Randomization Tests for Nonparametric Hypotheses", 1957, Annals of Mathematical Statistics, vol. 28, pp. 181-187.

U.S. Appl. No. 11/557,520 filed on Nov. 8, 2006 entitled: Apparatus, Method and Computer Program Product for Analysis of Fraud in Transaction Data, Applicant: Sheopuri et al.

"Hypothesis Testing in Statistics", ISBN: 0-08-043076-7, Elsevier Science Ltd., 2001 (4 pp.).

"Introduction to Monte Carlo Simulation", Samik Raychaudhuri, IEEE, Proceedings of the 2008 Winter Simulation Conference, pp. 91-100, Jun. 2008 (10 pp.).

"Likelihood-ratio test", Encyclopaedia of Mathematics, 2001 (accessed via SpringerLink—http://eom.springer.de/1/1058810.htm on Aug. 26, 2010, 2 pp.).

* cited by examiner

APPARATUS, METHOD, AND COMPUTER PROGRAM PRODUCT PROVIDING IMPROVED IDENTIFICATION OF SUSPECT ENTRIES IN TRANSACTION DATA

TECHNICAL FIELD

The exemplary embodiments of this invention relate generally to transaction processing systems, methods and computer program products and, more specifically, relate to audit and business management systems that process transaction data.

BACKGROUND

Businesses generally log various kinds of transaction data. For example, systems related to the management of travel and entertainment expenses may process a large number of transactions involving expenses and exceptions. A large enterprise might be expected to process hundreds of thousands of expense claims with each claim containing many individual expense items in various categories. An enterprise may desire to monitor and manage these business processes by performing audits to investigate cases that are potentially in violation of policies and also to determine when business controls are not being exercised appropriately. Effective use of audit resources generally requires that investigations identify cases that merit further action or investigation. Having a system and method to prioritize the entities for further investigation and audit can make more effective use of critical resources provided that the false positive rates are relatively low for the prioritization used.

Commonly-assigned U.S. Pat. No. 6,029,144 to Barrett et al. describes a system and method for checking expense entries for compliance with policy rules and detecting the possibility of fraud. This patent also describes a prioritization for ranking detected policy violations. The prioritization is done by clustering analysis using self organizing map (SOM) neural networks.

U.S. Pat. No. 6,643,625 to Acosta et al. describes a method for selecting a set of loans to audit. Among the criteria used in the described selection process is the notion of an exception rate which is the ratio of the number of exceptions to the number of opportunities for the exception. This simple scoring for exceptions might be considered faulty in that it would rank two entities with the same rate as being equal even though one might have higher counts for both numbers used to the compute the rate. If one entity did have higher counts, correspondingly there would be more evidence that might otherwise suggest an audit be performed.

Using the coded experience of previously-investigated claims, one can apply supervised learning algorithms to generate models that can be used to predict the likelihood of fraud based on various claim attributes. New claims that are predicted as the most likely to be fraudulent would be candidates for audit investigation. Reference in this regard may be made to "Strategies for detecting fraudulent claims in the automobile insurance industry," Viaene et. al., European Journal of Operational Research, August 2005. In this reference, Viaene et al. apply supervised learning methods to score and rank claims using historical data that includes outcomes of past investigations. However, in many domains and business processes, information on past investigations may be unavailable and this approach cannot be used.

Commonly-assigned U.S. patent application Ser. No. 11/557,520, entitled "Apparatus, System, Method and Computer Program Product For Analysis of Fraud in Transaction Data," describes techniques for determining if a particular claim is fraudulent by generating a score representing the probability of fraud. These techniques leverage the use of proxies. In some cases, proxies may not be available.

Commonly-assigned U.S. patent application Ser. No. 10/749,518, entitled "Resource-Light Method and Apparatus For Outlier Detection" (U.S. Patent Application Publication No. 2005/0160340), describes a method for outlier detection that can denote each instance in an n-dimensional feature space as a potential outlier.

SUMMARY

In an exemplary aspect of the invention, a method includes: providing transaction data having a plurality of pieces of information and an identification of a corresponding entity of a plurality of entities, wherein at least one piece of information of the plurality of pieces of information corresponds to each entity of the plurality of entities, wherein the transaction data comprises input data; computing at least one score for each entity of the plurality of entities by applying at least one statistical analysis technique to the input data, wherein the computed at least one score for a tested entity is indicative of at least one of a magnitude of deviation of the tested entity from a determined normal and repeated abnormal behavior of the tested entity; selecting zero or more entities of the plurality of entities by comparing at least one computed score of each entity with a specified threshold, wherein the selected zero or more entities comprise candidates for further investigation; and ordering the selected zero or more entities based on at least one computed score of each entity of the selected zero or more entities.

In another exemplary aspect of the invention, a computer program product includes program instructions embodied on a tangible computer-readable medium. Execution of the program instructions results in operations including: providing transaction data having a plurality of pieces of information and an identification of a corresponding entity of a plurality of entities, wherein at least one piece of information of the plurality of pieces of information corresponds to each entity of the plurality of entities, wherein the transaction data comprises input data; computing at least one score for each entity of the plurality of entities by applying at least one statistical analysis technique to the input data, wherein the computed at least one score for a tested entity is indicative of at least one of a magnitude of deviation of the tested entity from a determined normal and repeated abnormal behavior of the tested entity; selecting zero or more entities of the plurality of entities by comparing at least one computed score of each entity with a specified threshold, wherein the selected zero or more entities comprise candidates for further investigation; and ordering the selected zero or more entities based on at least one computed score of each entity of the selected zero or more entities.

In a further exemplary aspect of the invention, a data processing device includes: an input configured to receive transaction data having a plurality of pieces of information and an identification of a corresponding entity of a plurality of entities, wherein at least one piece of information of the plurality of pieces of information corresponds to each entity of the plurality of entities, wherein the transaction data comprises input data; a transaction processing unit coupled to the input and configured to compute at least one score for each entity of the plurality of entities, to select zero or more entities by comparing at least one computed score of each entity with a specified threshold, and to order the selected zero or more entities based on at least one computed score of each entity of the selected zero or more entities; and an output coupled to the transaction processing unit and configured to output an ordered list of the selected zero or more entities, wherein the at least one score is computed by applying at least one statistical analysis technique to the input data, wherein the computed at least one score for a tested entity is indicative of at least one of a magnitude of deviation of the tested entity from a determined normal and repeated abnormal behavior of the tested entity, wherein the selected zero or more entities comprise candidates for further investigation.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Figure 1:
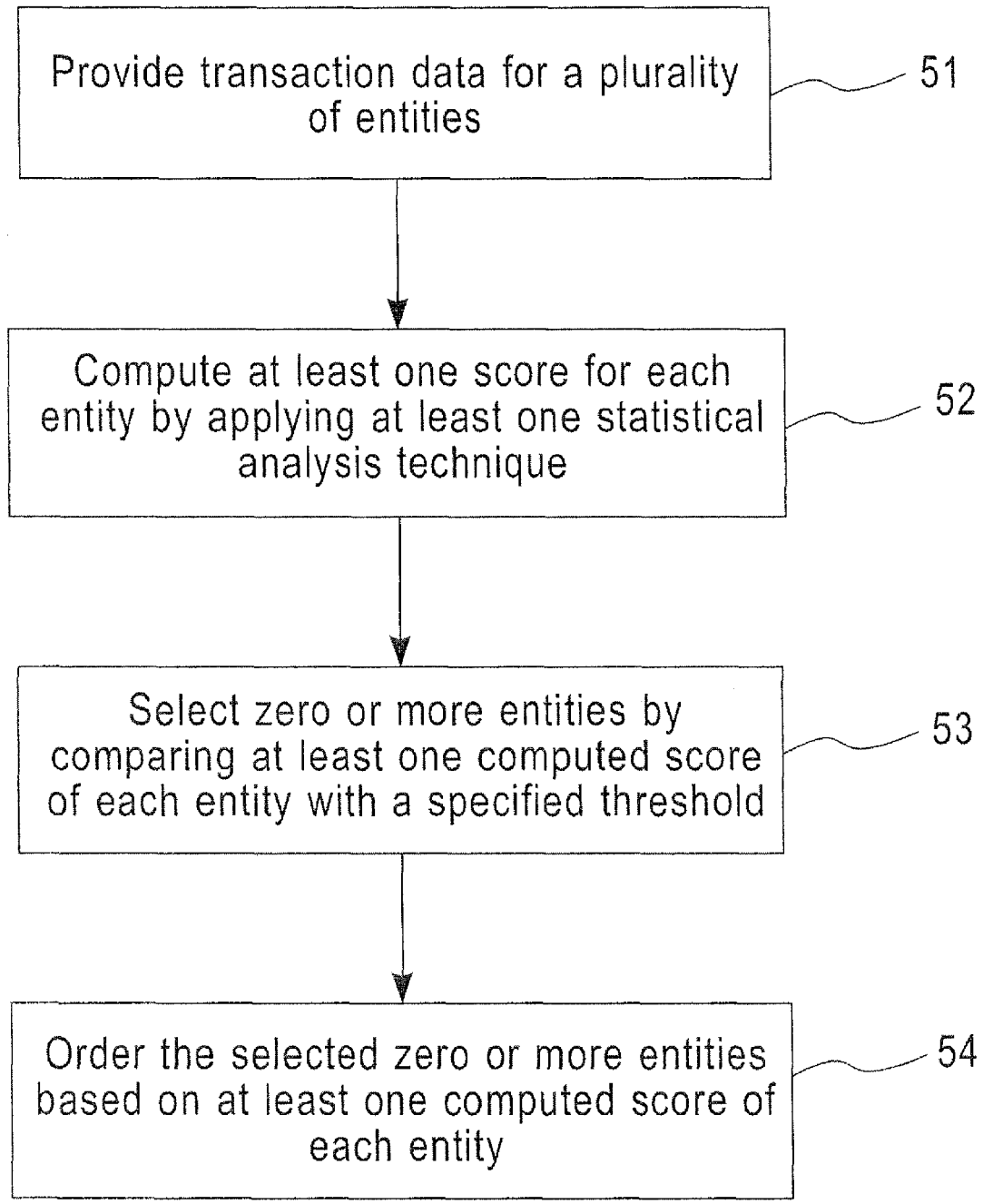
FIG. 1 shows a flowchart illustrating one non-limiting example of a method for practicing the exemplary embodiments of this invention.

The exemplary embodiments of the invention provide apparatus, systems, methods and computer program products for scoring entities in order to use the scoring for such tasks as identifying and prioritizing those entities that are candidates for further investigation, for example, from an audit or business control perspective. This is accomplished by analyzing the transaction data logged by business processes for participating entities in the enterprise. Each line item in the transaction data may be time stamped and includes information on the entity associated with the line item as well as various attributes that can influence the magnitude of expenses and the occurrences of exceptions. The exemplary embodiments of the invention do not require coded outcomes of prior investigations to generate the scoring.

In one non-limiting, exemplary embodiment, a robust score is generated for each entity in order to test the hypothesis that the expense amounts or timings for the entity in question have a distribution that is shifted significantly (e.g., in a pre-specified direction or manner) when compared to the corresponding distribution for the enterprise at large. The scoring may take into account predefined normalization factors that can influence the expense amounts or timings. Similarly, an exemplary embodiment of the invention generates a robust score for each entity that tests the hypothesis that the number of exceptions (e.g., as generated or approved) for the entity in question is significantly higher while taking into account the number of opportunities for the occurrence of these exceptions and other such factors that influence the exceptions.

The techniques described by the exemplary embodiments of the invention provide a number of advantages and benefits. Coded outcomes from prior investigations are not needed. The analysis can be performed at various levels of the enterprise (e.g., employee, approver, department, accounting center, pay center, division, business unit, and subsidiary). The generated score can be used to determine if an entity has a significantly shifted behavior with respect to expense amounts, timings or exceptions while accounting for factors known to domain experts and which are available in the transaction data. The workload for further investigation (e.g., audit) is thus reduced by only presenting the significantly shifted entities.

The entities with the more significant scores (e.g., relatively significant shifts) can be ranked using the scores so that they are considered or investigated in a prioritized order that captures some notion of the magnitude of deviation from normal (e.g., as compared to and defined by the behavior in the entire enterprise). The generated score is based on a detailed analysis of the profile of the expenses, timings or exceptions in question across the enterprise and thus achieves a reduced false positive rate. The generated score for an entity takes into account its behavioral profile such that repeated behaviors outside the norm result in increased significance. This fits well with the notion of having the score be proportional, at least to some degree, to the evidence for audits and is an advantage when compared to simpler scoring methods (e.g., average, median, minimum, maximum, percentiles).

The entities of interest for which a score is generated (e.g., for audit and business control purposes) may depend on the business process being monitored, as a non-limiting example. For example, in the travel and entertainment management domain, the entities of interest could be an organizational unit (e.g., department) within the enterprise (e.g., business). As non-limiting examples, these may include the individual employees, approvers, departments, accounting center, payment centers, divisions, business units or geographical partitions of the enterprise. The entity of interest may also be any player in the business process (e.g., a subcontractor or vendor providing a service or product to the enterprise).

With specific reference to FIG. 1, in one, non-limiting exemplary embodiment, a method (e.g., a computer implemented method) includes the following steps.

Transaction data is provided (box 51). The transaction data comprises a plurality of pieces of information and an identification of a corresponding entity (e.g., for each piece of information) of a plurality of entities. At least one piece of information of the plurality of pieces of information corresponds to each entity of the plurality of entities. The transaction data comprises input data. The specific form and contents of the transaction data may be dependent on the information to be monitored (e.g., real valued targets or target events) and/or the type of records available (e.g., the format and/or contents of the available information), as non-limiting examples. Specific examples of suitable transaction data are further described below.

At least one score is computed for each entity of the plurality of entities by applying at least one statistical analysis technique to the input data (box 52). The computed at least one score for a tested entity is indicative of at least one of a magnitude of deviation of the tested entity from a determined normal and repeated abnormal behavior of the tested entity.

As non-limiting examples, the at least one statistical analysis technique may comprise a likelihood ratio test (LRT) and/or a Monte Carlo method. As a non-limiting example, the at least one score may comprise a first score computed using a first statistical analysis technique and a second score computed using a second statistical analysis technique.

Zero or more entities are selected by comparing at least one computed score of each entity with a specified threshold (box 53). The selected zero or more entities comprise candidates for further investigation. As non-limiting examples, the candidates for further investigation may comprise candidates for at least one of an audit and a business control process.

The selected zero or more entities are ordered based on at least one computed score of the selected zero or more entities (box 54).

As non-limiting examples, the exemplary embodiments of the invention may be directed towards monitoring real valued targets or target events. These two examples will be considered below in greater detail.

Real Valued Targets

There are many examples of real valued targets that may be monitored for audit and business control purposes. For example, expense amounts corresponding to various expense types are generally logged as part of business processes and it may be desirable to analyze them for conformance and audit purposes. Typically there is a taxonomy for expense types that is specified and that determines which expenses are grouped together for analysis. Another example of a real valued target is delay incurred in specific parts of a business process (e.g., delay in submission of expense claims).

The exemplary embodiments of the invention provide a computer implemented method for computing at least one real valued score to determine the relative significance and ranking of the entities. One example of a use for the computed scores is to identify candidate entities for audit and business control purposes. Furthermore, the candidate entities may be prioritized based on at least one of the scores.

The exemplary embodiments of the invention perform analysis on transaction data. As a non-limiting example, the transaction data may be comprised of a plurality of entries. Each entry of the transaction data comprises an identity of an associated entity and a target value. For example, if the entry or transaction data corresponds to a travel and entertainment (T&E) expense, the identity of the associated entity may comprise a name of the person who submitted the T&E expenditure voucher. In such an example, the target value would be the amount of the expenditure. Generally, the target value comprises the corresponding value of interest based upon which further investigation may be desirable.

In further exemplary embodiments, each entry of the transaction data may further comprise at least one time stamp related to the transaction, values for any factors that are known to influence the associated target value and/or a description or indication of the type of entry, as non-limiting examples.

A non-limiting example of suitable transaction data is described below. Each entry of the exemplary transaction data comprises five fields of information. For simplicity, the information in each field may comprise a numerical value that corresponds to information for that entry. The five fields are: expense amount, expense type, expense country, expense purpose and identity of an associated person, as further described below.

The expense amount corresponds to the amount of the claim in, or converted to, some common monetary unit, such as United States Dollars (USD) (if necessary). As such, one may define:

$$Expense_{amount} = \text{Expense amount in USD.} \quad (1)$$

The expense type comprises a categorization of the expense based on what was purchased. For example, expense types may include: BRK (breakfast), AIR (airfare), BENT (Business & Entertainment), CAR (car rental) and FEESC (Food and Seminar). This enables one to define a variable:

$$Expense_{type} = \begin{cases} 1 & \text{Expense type} \in \{AIR, CAR\}; \\ 2 & \text{Expense type} \in \{DIN, BENT, FEESC\}. \end{cases} \quad (2)$$

The expense country indicates in which country the expense was paid. For this example, assume that the expense country is delineated into those made in the United States and those occurring elsewhere, such that one may then define a country variable:

$$Expense_{country} = \begin{cases} 1 & USA; \\ 0 & \text{others.} \end{cases} \quad (3)$$

The expense purpose indicates the corresponding purpose for which the expense was made. As non-limiting examples, the expense may have been made in the course of entertaining a client, continuing education (e.g., a seminar or lecture) or production meetings. One may define a purpose variable:

$$Expense_{purpose} = \begin{cases} 0 & \text{entertaining a client} \\ 1 & \text{continuing education} \\ 2 & \text{production meeting} \\ 3 & \text{other} \end{cases} \quad (4)$$

Lastly, the identity of an associated person is included in the entry. As non-limiting examples, the associated person may be the person seeking reimbursement, the person who expended the amount or the person who authorized the expenditure. One may define a discrete variable:

$$Identity = \begin{cases} 0 & \text{Supervisor Alice } (A) \\ 1 & \text{Employee Bob } (B) \\ 2 & \text{Employee Claire } (C) \end{cases} \quad (5)$$

In such a manner, an entry (x) in the exemplary transaction data comprises a set of five values. In the exemplary transaction data described above, the target value is the expense amount.

As a non-limiting example, the exemplary embodiments of the invention may be utilized in an environment where the real valued target is monitored for the entities of interest. Logs from the business process may capture transaction data that includes, for each line item, the identity of the associated entity, time stamps related to the transaction, the target value and values for any factors that are known to influence the target value, as non-limiting examples. It may be desirable to bin values for non-categorical factors (e.g., before employing an exemplary method as further described below).

Figure 2:
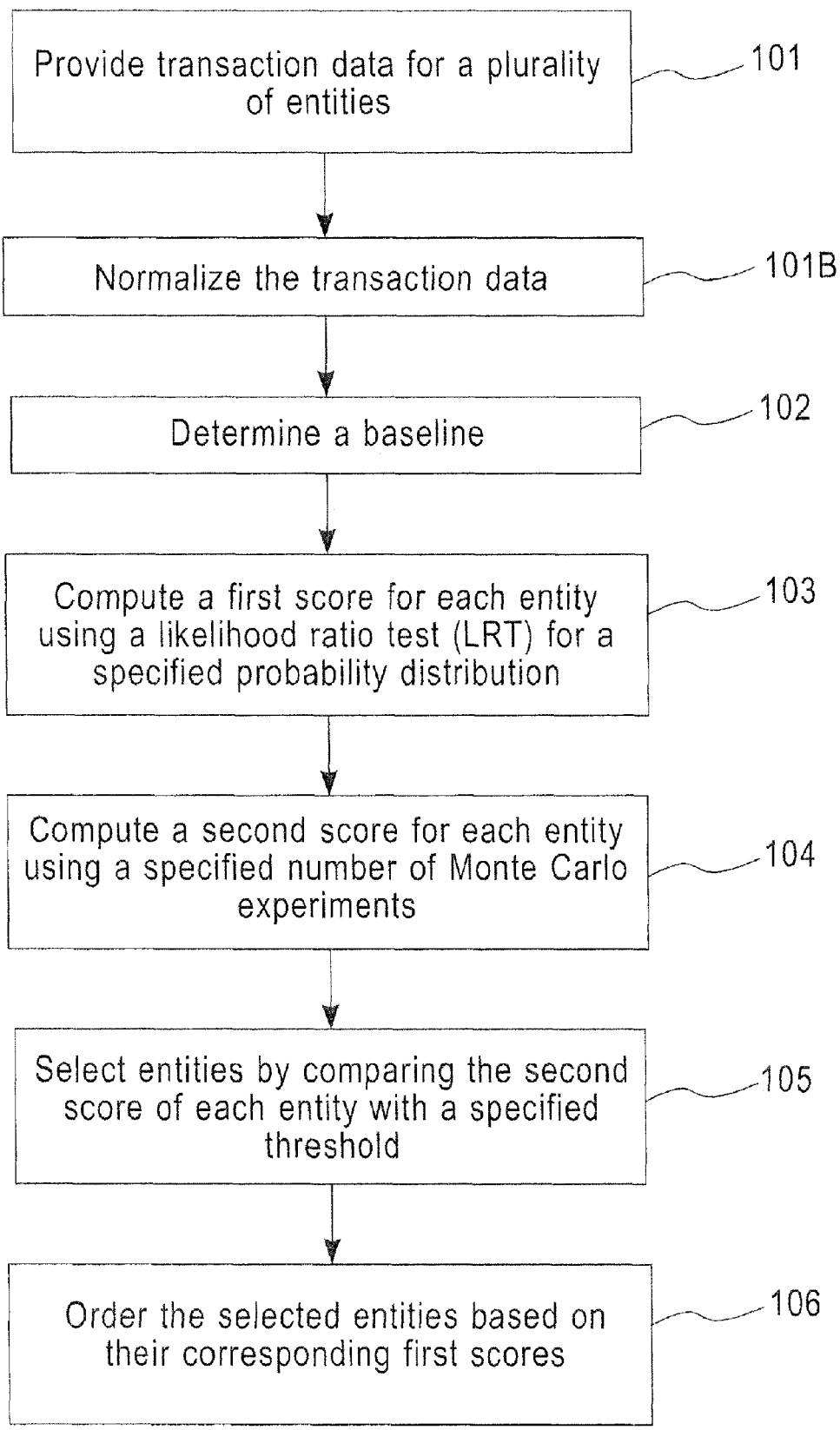
FIG. 2 depicts a flowchart illustrating another non-limiting example of a method for practicing the exemplary embodiments of this invention.

With specific reference to FIG. 2, in one, non-limiting exemplary embodiment, a method (e.g., a computer implemented method) includes the following steps.

Transaction data is provided (box 101). The transaction data includes a plurality of entries with each entry having at least a target value and an indication of an identity of an associated entity. The associated entity is one of a plurality of entities to which the transaction data corresponds. In other exemplary embodiments, the transaction data includes one or more additional pieces of information, such as at least one time stamp and/or values for any factors that are known to influence the target value. As utilized herein in this exemplary method, the transaction data comprises input data.

Utilizing the input data, a baseline is determined (box 102). The baseline comprises a set of input values over the plurality of entities excluding those input values determined to be significantly abnormal even in isolation. As a non-limiting example, an input value may be considered significantly abnormal if a test such as the likelihood ratio test indicates that the input value is an outlier in comparison with a pre-defined threshold.

A first score is computed for each entity using a likelihood ratio test (LRT) for a specified probability distribution (box 103). As non-limiting examples, the specified probability distribution may comprise an exponential distribution or a gamma distribution. The computation of the first score is described in greater detail below.

A second score is computed for each entity using a specified number (Z) of Monte Carlo experiments (box 104). In each Monte Carlo experiment, each target value corresponding to a tested entity is replaced by a value sampled at random from the baseline. For each tested entity, the first score is computed as described above based on these randomly sampled values. For each Monte Carlo experiment, a maximum score (Y) achieved by any entity is recorded. The second score of a tested entity comprises a value indicative of a ratio of a number (L) of Monte Carlo experiments having a maximum score (Y) exceeding the first score of the tested entity to the specified number (Z) of Monte Carlo experiments.

As non-limiting examples, the specified number (Z) of Monte Carlo experiments may be user-specified or predetermined. As a non-limiting example, for a tested entity (E), the second score ($S_{2-E}$) may comprise a non-zero value given by:

$$S_{2-E} = \frac{L+1}{Z} \quad (6)$$

Entities are selected by comparing the second score of each entity with a specified threshold (box 105). As a non-limiting example, the comparison may comprise selecting any entities that have a second score below the specified threshold. The selected entities comprise candidates for further investigation (e.g., audit).

In further exemplary embodiments, the selected entities are ordered (e.g., ranked) based on their corresponding first scores (box 106). As a non-limiting example, the selected entities may be ranked in reverse order of the first scores (e.g., where the lowest first score is ranked as the most significant or first candidate). In such exemplary embodiments, the ranked list of selected entities comprises a prioritized list of candidates, for example, for audit and business control purposes.

In other exemplary embodiments, the transaction data includes factors and the target values are normalized based on the categorized values for the corresponding factors to obtain the input values (box 101B). That is, the normalized target values comprise the input values. The factors comprise any factors that are known to influence the target value. The normalization method may depend on the probability distribution used for the LRT. As a non-limiting example, the target values are transformed, if needed, to non-negative values, the exponential distribution is used for the LRT and the target value is normalized by dividing it by the mean of the target values for all entities with the same combination of categorized values for the factors. As a further non-limiting example, the target values are transformed, if needed, to non-negative values, the exponential distribution is used for the LRT and the target value is normalized by dividing it by the maximum of the target values for all entities with the same combination of categorized values for the factors.

As a non-limiting example, the real valued target may comprise an amount of one or more specified types of expenses. As a further non-limiting example, the real valued target may comprise a time period computed from time stamps in the transaction data. As another non-limiting example, the target value may comprise an expense amount in at least one expense category that has a limit value associated with the expense claim process and the corresponding limit value may be used as a factor. As a further non-limiting example, the target value may comprise an expense amount in at least one expense category that was paid in cash, where the expense category and the location where the expense was incurred are used as factors. As another non-limiting example, the target value may comprise an expense amount in at least one expense category, where a subset of the expense category, a location where the expense was incurred and the corresponding organizational segment are used as factors. As further non-limiting examples, the target value may comprise a delay in claiming expenses (e.g., based on time stamps in the transaction data) or a delay in clearing advances taken towards expenses (e.g., based on time stamps in the transaction data).

As non-limiting examples, the plurality of entities may comprise at least one of an employee, an employer, an approver, a person in management, an organizational unit, an organizational unit of a business, a department, a center, a division, an accounting division, a payment division, a geographical division, a subcontractor, a service provider and a supplier. As a further non-limiting example, the entity in question may have a business relationship with the enterprise that is tracked in the transaction data, such as a vendor providing a service or a product to the enterprise.

The LRT is a statistical test in which the ratio is computed between the maximum of the likelihood function under an alternate hypothesis and the maximum of the likelihood under a null hypothesis. As a non-limiting example, in the context presented above, a broad formulation of the LRT used to compute the first score (Score1(E)) for an entity (E) comprises:

$$\text{Score1}(E) = \frac{SUP[\text{Likelihood(Distinct distributions for entity } E \text{ and for the remaining entities)}]}{SUP[\text{Likelihood(Same distributions for all entities)}]} \quad (7)$$

The numerator of the exemplary broad formulation computes the least upper bound (SUP) for the likelihood that the entity (E) has a distribution (e.g., of input values) that is distinct from the distribution for other entities (alternate hypothesis). The denominator computes the least upper bound (SUP) for the likelihood that all entities have a same distribution (null hypothesis).

The precise formula used to compute the first score (e.g., the likelihoods in the first score) may depend on the specified probability distribution.

A non-limiting example for computing the first score is presented. Assume that the exponential distribution is used for the LRT. Consider an entity E with M normalized values that sum up to S. Let the total number of normalized values over all the entities be N and their sum be T. The first score ($S_{1-E}$) using the LRT for the exponential distribution may be computed as:

$$S_{1-E} = M \times \log\left(\frac{M}{S}\right) + (N - M) \times \log\left(\frac{N - M}{T - S}\right) - N \times \log\left(\frac{N}{T}\right). \quad (8)$$

Reference with regard to equation (8) may be made to "A Spatial Scan Statistic For Survival Data," by Huang et al., Biometrics, Vol. 63, Issue 1, pp. 109-118, March 2006.

As a non-limiting example, the LRT can be made one-sided by using the above formula only when the normalized values are higher or lower for the entity in question as compared to the mean considering all entities.

One of ordinary skill in the art will appreciate the above-described use of the LRT. However, with regard to the LRT, it is herein noted that reference may generally be made to J. Neyman and E. S. Pearson, "Join Statistical Papers," Cambridge Univ. Press, 1967. Reference in this regard may also be made to E. L. Lehmann and Joseph P. Romano, "Testing Statistical Hypotheses," Springer, 2006.

Similarly, one of ordinary skill in the art will appreciate the above-described use of Monte Carlo experiments. However, with regard to Monte Carlo methods and experiments, it is herein noted that reference may generally be made to Bernd A. Berg, "Markov Chain Monte Carlo Simulations and Their Statistical Analysis (With Web-Based Fortran Code)," World Scientific, 2004. Reference in this regard may also be made to G. S. Fishman, "Monte Carlo: Concepts, Algorithms, and Applications," Springer Verlag, 2005.

Target Events

Many target events, for example, triggered by business rules, may be monitored for audit and control purposes. For example, in the T&E expense management domain, there could be business rules that define the appropriate class of air travel based on travel details, the business purpose and organizational attributes of the traveler. A non-limiting example of a target event is a violation of the air travel class business rule. These violations may also be referred to as exceptions. Another non-limiting example of a target event is the approval of such an exception. Each instance of air travel by an entity in the enterprise would provide an opportunity for this exemplary target event. Another non-limiting example of a target event is an exception to the business rule that requires receipts to be submitted for all travel expenses that exceed a certain amount. This business rule might be specified for more than one expense type such as meals, tips and ground transportation. Each instance of a travel expense of the specified type would provide an opportunity for this exception. The expense type itself could be considered as a categorical factor for this target event since the intrinsic rate of occurrence for this exception can vary across these types due to extraneous factors such as availability of receipts.

As a non-limiting example, the exemplary embodiments of the invention can be utilized in an environment where the transaction data comprises logged records for each opportunity for each entity along with an indication whether the target event occurred and with the categorized values for the specified factors. It may be desirable to bin values for non-categorical factors before being used by the exemplary embodiments of the invention.

Figure 3:
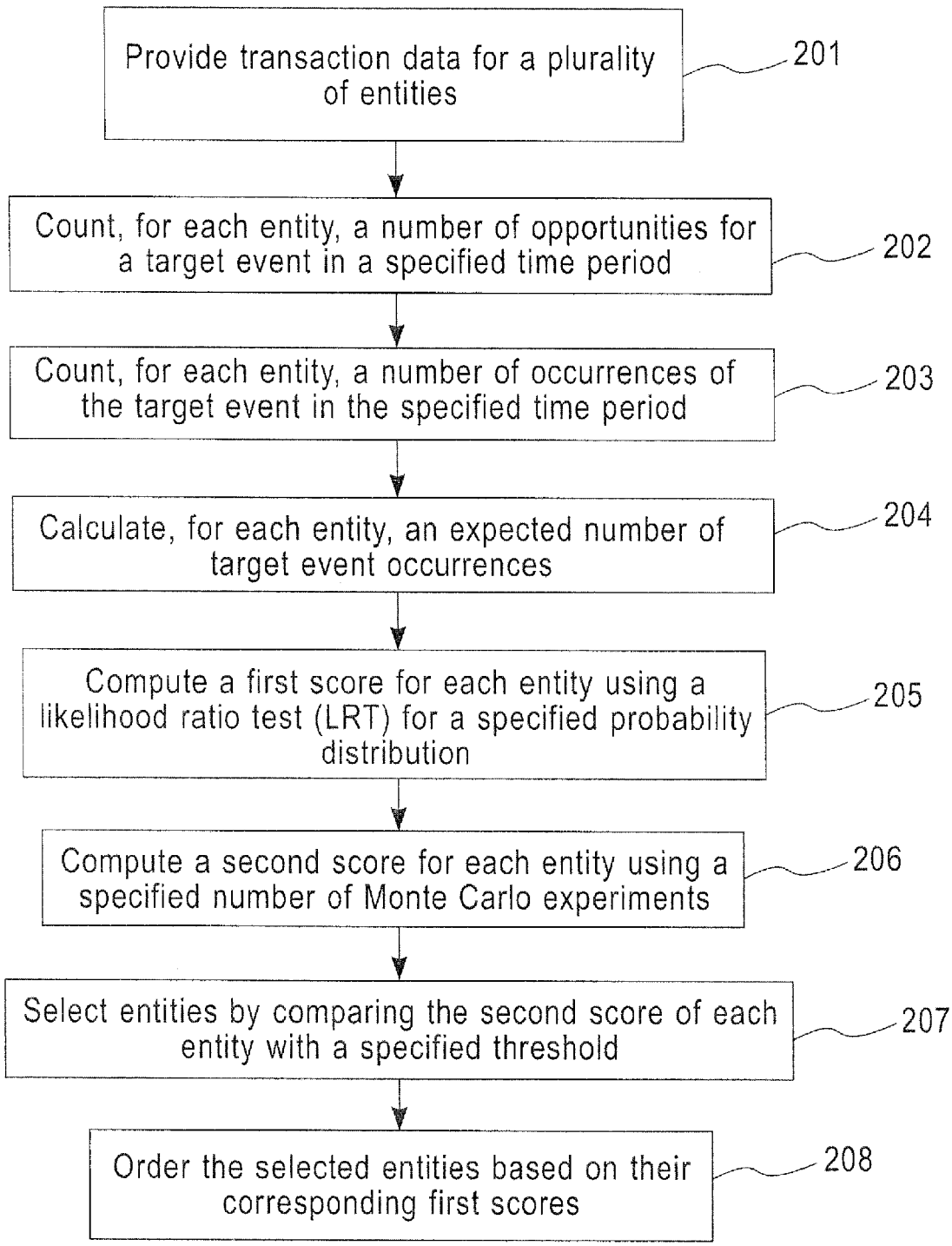
FIG. 3 shows a flowchart illustrating another non-limiting example of a method for practicing the exemplary embodiments of this invention.

With specific reference to FIG. 3, in one, non-limiting exemplary embodiment, a method (e.g., a computer implemented method) includes the following steps. Note that one exemplary use for the below-described method is to identify candidate entities for audit and business control purposes in a prioritized manner.

Transaction data is provided (box 201). The transaction data includes a plurality of entries with each entry having at least an indication of a corresponding event and an indication of an identity of an associated entity. The associated entity is one of a plurality of entities to which the transaction data corresponds. In other exemplary embodiments, the transaction data includes one or more additional pieces of information, such as at least one time stamp, a target value and/or values for any factors that are known to influence the target value.

The transaction data is scanned to count, for each entity, a number of opportunities for a target event in a specified time period P (box 202). In other exemplary embodiments, this may be broken down by each relevant combination of categorical values for the factors.

The transaction data is also scanned to count, for each entity, a number of occurrences of the target event in the specified time period P (box 203). In other exemplary embodiments, this may be broken down by each relevant combination of categorical values for the factors.

The counts of the opportunities and target event occurrences are used to calculate an expected number of target event occurrences for each entity (box 204).

As a non-limiting example, the expected count may be calculated using indirect standardization. For example, let O(E, F) and V(E, F) represent the number of opportunities and the count of target event occurrences for entity E for the combination F of categorical values for the factors, respectively. The expected number of target event occurrences X(E) for an entity E may be calculated as:

$$X(E) = \sum_F \left\{ \left( \frac{\sum_E V(E, F)}{\sum_E O(E, F)} \right) \times O(E, F) \right\}. \quad (9)$$

As another non-limiting example, the expected counts for target event occurrences for each entity may be calculated with a regression model using the factors as the independent variables.

A first score for each entity is computed using a LRT for a specified probability distribution (box 205). The LRT uses the alternate hypothesis that the occurrences of the target event for the tested entity have a different distribution than the corresponding occurrences of the target event for the other entities of the plurality of entities. Relatedly, the null hypothesis of the LRT is that the plurality of entities have the same distribution for the target event occurrences.

As a non-limiting example, the specified probability distribution may comprise the Poisson distribution. In such an example, the first score ($S_{1-E}$) is computed as:

$$S_{1-E} = O(E) \times \log\left(\frac{O(E)}{X(E)}\right) + (U - O(E)) \times \log\left(\frac{U - O(E)}{U - X(E)}\right). \quad (10)$$

In equation (10), O(E) represents the aggregate number of target event occurrences in the time period P considering all relevant combinations of categorical values for the factors. U represents the total number of occurrences of target events in the period P for all entities. X(E) is the previously calculated expected number of target events for entity E.

Reference with regard to equation (10) may generally be made to Kulldorff, "A Spatial Scan Statistic, Communications in Statistics: Theory and Methods," 26:1481-1496, 1997.

As a non-limiting example, the LRT can be made one-sided by using the above formula only when the actual counts of target events for an entity are one of greater or lesser than the expected counts. In another exemplary embodiment, the LRT uses the Bernoulli model.

A second score is computed for each entity using a specified number (Z) of Monte Carlo experiments (box 206).

As a non-limiting example, in each Monte Carlo experiment, the count of target event occurrences is determined by randomly sampling from a Poisson distribution with mean value equal to the expected number X(E) of target event occurrences previously calculated. The first score is computed as above-described based on the randomly sampled counts and, for each experiment, a maximum score (Y) achieved by any entity is recorded. The second score of a tested entity comprises a value indicative of a ratio of a number (L) of Monte Carlo experiments having a maximum score (Y) exceeding the first score of the tested entity to the specified number (Z) of Monte Carlo experiments.

As non-limiting examples, the specified number (Z) of Monte Carlo experiments may be user-specified or predetermined. As a non-limiting example, for a tested entity (E), the second score ($S_{2-E}$) may comprise a non-zero value given by:

$$S_{2-E} = \frac{L+1}{Z} \qquad (6)$$

Entities are selected by comparing the second score of each entity with a specified threshold (box 207). As a non-limiting example, the comparison may comprise selecting any entities that have a second score below the specified threshold. The selected entities comprise candidates for further investigation (e.g., audit).

In further exemplary embodiments, the selected entities are ordered (e.g., ranked) based on their corresponding first score (box 208). As a non-limiting example, the selected entities may be ranked in reverse order of the first scores (e.g., where the lowest first score is ranked as the most significant or first candidate). In such exemplary embodiments, the ranked list of selected entities comprises a prioritized list of candidates, for example, for audit and business control purposes.

In other exemplary embodiments, the transaction data further comprises at least one categorized value for at least one specified factor that corresponds to at least one event of the plurality of events. In such an exemplary embodiment, the method further comprises: taking the at least one categorized value into account when considering the corresponding target event for the corresponding entity, wherein the at least one specified factor of the at least one categorized value comprises at least one factor identified as influencing the corresponding target event.

In other exemplary embodiments, the transaction data may further comprise a flag indicating of the corresponding target event occurred. As non-limiting examples, the target event may comprise an exception event or an exception approval event. As a non-limiting example, the exception may comprise a violation of a business rule associated with one or more expense types. As a non-limiting example, the expense type may comprise a factor. As a non-limiting example, a business rule may define a highest class of service that can be used for specific travel (e.g., air travel).

As non-limiting examples, the plurality of entities may comprise at least one of an employee, an employer, an approver, a person in management, an organizational unit, an organizational unit of a business, a department, a center, a division, an accounting division, a payment division, a geographical division, a subcontractor, a service provider and a supplier. As a further non-limiting example, the entity in question may have a business relationship with the enterprise that is tracked in the transaction data, such as a vendor providing a service or a product to the enterprise.

Figure 4:
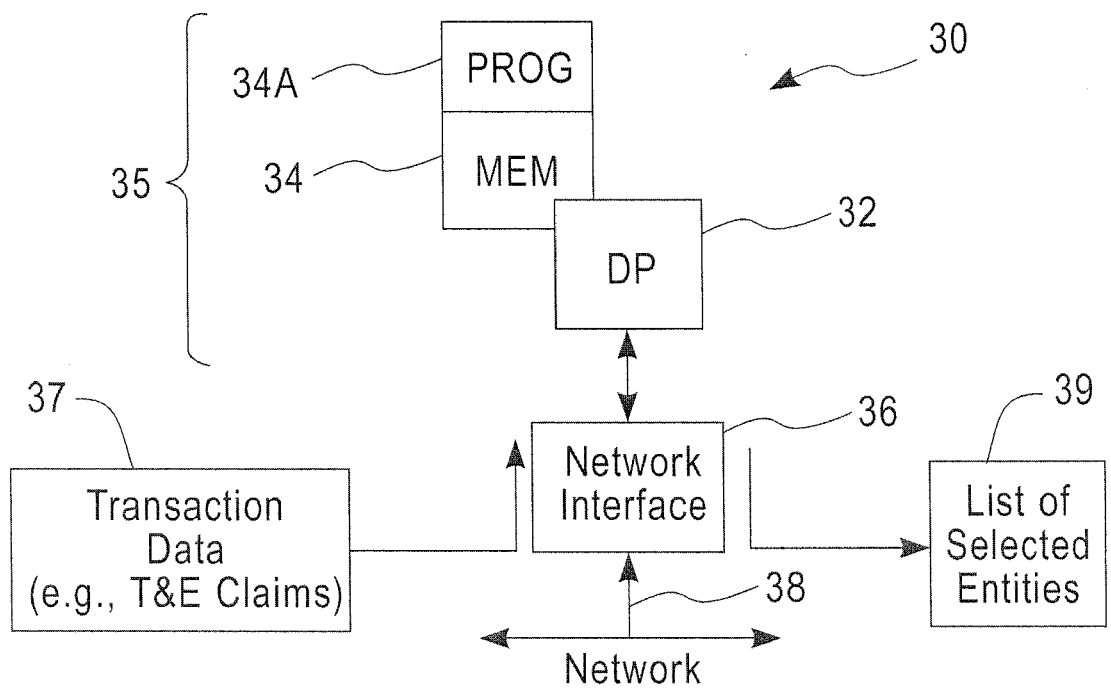
FIG. 4 shows a block diagram of an exemplary computing system that is one suitable environment in which exemplary embodiments of the invention may be embodied.

Reference is now made to FIG. 4 for showing a block diagram of an exemplary computing system 30 that is one suitable environment in which exemplary embodiments of the invention may be embodied. The system 30 includes at least one data processor (DP) 32 that is coupled with at least one memory (MEM) 34. The memory 34 stores a program (PROG) 34A containing program instructions that, when executed by the data processor 32, results in the implementation of the exemplary methods discussed above, including those shown in FIGS. 1, 2 and 3. The data processor 32, memory 34 and program 34A may be considered collectively to form a claim processing unit 35. The data processor 32 is coupled to a network interface 36 providing bi-directional communication with a data communication network 38. Transaction data 37, such as T&E claims, are input to the data processor 32 and are operated on by the program 34A to produce a list of selected entities 39 that is output through the network interface 36. In a non-limiting exemplary embodiment, the transaction data 37 is received from a database.

The exemplary system 30 can be embodied in any suitable form, including a main frame computer, a workstation and a portable computer such as a laptop. The data processor 32 can be implemented using any suitable type of processor including, but not limited to, microprocessor(s) and embedded controllers. The memory 34 can be implemented using any suitable memory technology, including one or more of fixed or removable semiconductor memory, fixed or removable magnetic or optical disk memory and fixed or removable magnetic or optical tape memory, as non-limiting examples. The network 38 and network interface 36 can be implemented with any suitable type of wired or wireless network technology, and may include a local area network (LAN) or a wide area network (WAN), including the internet. Communication through the network can be accomplished at least in part using electrical signals, radio frequency signals and/or optical signals, as non-limiting examples.

An exemplary embodiment of the invention has been implemented in a system that can access transaction data logs and perform the scoring and ranking of entities as described above. The exemplary embodiment was validated using empirical analysis with synthetic data using idealized distributions and with real data in the travel and entertainment management domain from multiple enterprises.

For example, synthetic data was generated using the exponential distribution with a mean value of 1 for 1000 entities. The number of data elements for each entity representing repeat behavior was chosen randomly from an exponential distribution with mean value 16. Multiple experiments were performed where in each experiment an entity was chosen at random and the values of its data elements were increased to simulate abnormal behavior in terms of excessive expenses. An exemplary method, in accordance with the exemplary embodiments of the invention, was applied to determine the conditions under which it detected the simulated abnormal entity. The simulated entity with excess was detected if the total amount of simulated excess was greater than 0.51* (xvalue)+13.26 (where xvalue corresponds to the number of data elements for the entity) at a threshold of 0.01 or below for the second score. No entities without the added excess were detected at this threshold.

Figure 5:
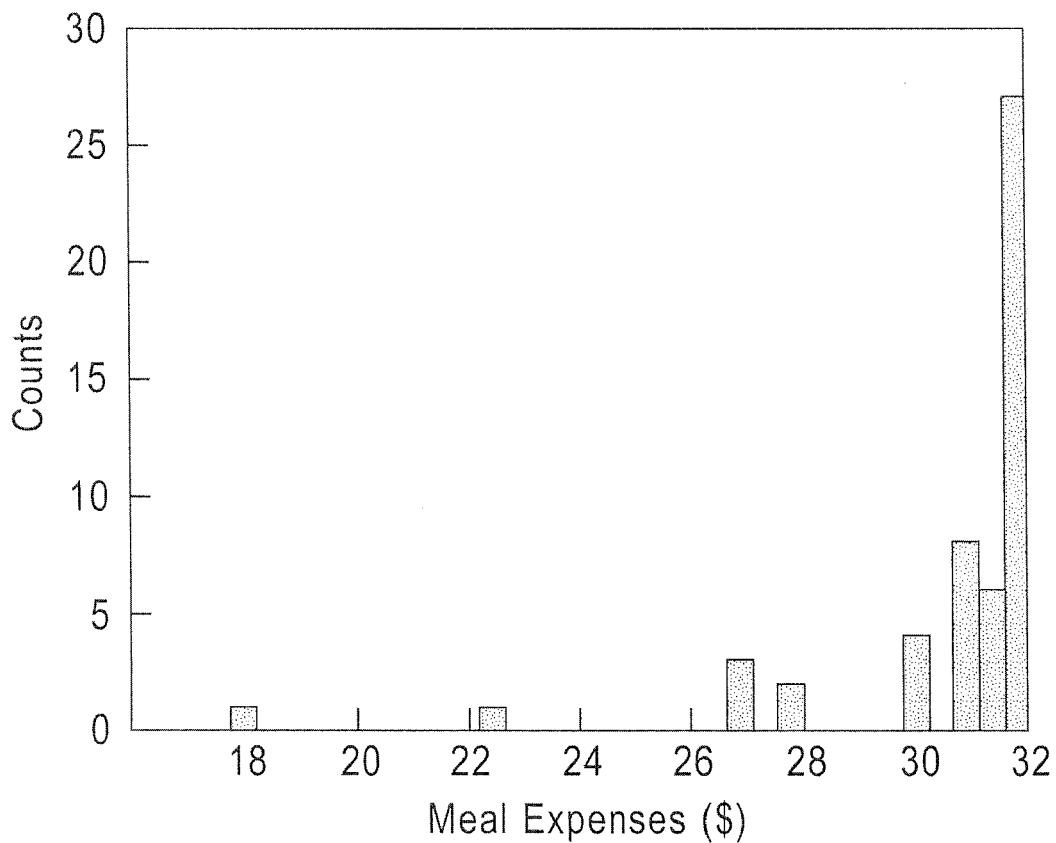
FIG. 5 shows an exemplary histogram of meal expenses from an individual identified, in accordance with the exemplary embodiments of the invention, as having significantly excessive expenses in this category which has a limit of $32.

Presented below are example results from applying an exemplary embodiment of the invention to real data from an enterprise in the domain of travel and entertainment expense management. FIG. 5 shows an exemplary histogram of meal expenses from an individual identified, in accordance with the exemplary embodiments of the invention, as having significantly excessive expenses in this category which has a limit of $32. The profile of meal expenses for this individual identified by this invention was validated to be worthy of further investigation due to predominance just below the limit value of $32.

An exemplary embodiment of the invention was also applied to data from an enterprise for various target events. As an example, presented below are the results from the application to the approval of exceptions triggered by the use of a higher class of air travel than what is authorized. The entities were analyzed at a high level of the organization and the top entity identified had a target event rate of 32% with respect to its opportunities. The target event occurred 74 times representing enough evidence of this repeat behavior of excessive approval of this exception when compared to the rate of 11% across the enterprise.

Generally, various exemplary embodiments of the invention can be implemented in different mediums, such as software, hardware, logic, special purpose circuits or any combination thereof. As a non-limiting example, some aspects may be implemented in software which may be run on a computing device, while other aspects may be implemented in hardware.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A computer-implemented method comprising:
    providing transaction data comprising a plurality of pieces of information and an identification of a corresponding entity of a plurality of entities, wherein at least one piece of information of the plurality of pieces of information corresponds to each entity of the plurality of entities, wherein the plurality of pieces of information comprises a plurality of target values, wherein the transaction data comprises input data;
    determining a baseline comprising a set of target values over the plurality of entities excluding any target values considered to be significantly abnormal;
    computing at least one score for each entity of the plurality of entities by applying at least one statistical analysis technique to the input data, wherein the computed at least one score for a tested entity is indicative of at least one of a magnitude of deviation of the tested entity from a determined normal and repeated abnormal behavior of the tested entity, wherein computing the at least one score comprises computing a first score by applying a first statistical analysis technique, wherein computing the at least one score further comprises computing a second score by applying a second statistical analysis technique, wherein the first statistical analysis technique comprises a likelihood ratio test for a specified probability distribution, wherein the second statistical analysis technique comprises comparing the first score of the tested entity with corresponding first scores obtained from simulation experiments that assign target values to entities by randomly sampling the assigned target values from the baseline;
    selecting zero or more entities of the plurality of entities by comparing at least one computed score of each entity with a specified threshold, wherein the selected zero or more entities comprise candidates for further investigation; and
    ordering the selected zero or more entities based on at least one computed score of each entity of the selected zero or more entities.

2. The computer-implemented method of claim 1, wherein the transaction data further comprises at least one categorized value for at least one specified factor that corresponds to at least one target value of the plurality of target values, the computer-implemented method further comprising:
    normalizing the at least one target value based on the corresponding at least one categorized value to obtain the corresponding input value, wherein the at least one specified factor of the at least one categorized value comprises at least one factor identified as influencing the corresponding at least one target value.

3. The computer-implemented method of claim 2, wherein the likelihood ratio test utilizes an alternate hypothesis and a null hypothesis, wherein the alternate hypothesis comprises that a tested entity has a different distribution for its normalized at least one target value as compared with a remainder of the plurality of entities, wherein the null hypothesis comprises that the normalized target values for the plurality of entities have a same distribution, wherein the second statistical analysis technique comprises using a specified number (Z) of Monte Carlo experiments, wherein for each Monte Carlo experiment a maximum score (Y) achieved by any entity is recorded, wherein the second score of a tested entity comprises a value indicative of a ratio of a number (L) of Monte Carlo experiments having a maximum score (Y) exceeding the first score of the tested entity to the specified number (Z) of Monte Carlo experiments.

4. The computer-implemented method of claim 3, wherein the specified probability distribution comprises an exponential distribution, wherein a total number of input values N over the plurality of entities sums up to a number T, wherein for an entity E having M input values that sum up to S the corresponding first score $(S_{1-E})$ is computed as $$S_{1-E} = M \times \log\left(\frac{M}{S}\right) + (N-M) \times \log\left(\frac{N-M}{T-S}\right) - N \times \log\left(\frac{N}{T}\right).$$

wherein the corresponding second score $(S_{2-E})$ for the entity E is computed as:

$$S_{2-E} = \frac{L+1}{Z}.$$

5. The computer-implemented method of claim 1, wherein each target value of the plurality of target values comprises one of an expense amount in one or more expense categories or a delay in one of claiming expenses or clearing expenses.

6. The computer-implemented method of claim 1, wherein the plurality of pieces of information comprises a plurality of events, the computer-implemented method further comprising:
   determining, for each entity of the plurality of entities, a number of opportunities for a target event in a specified time period based on the provided transaction data;
   determining, for each entity of the plurality of entities, a number of occurrences of the target event in the specified time period based on the provided transaction data; and
   computing, for each entity of the plurality of entities, an expected number of target event occurrences using the corresponding determined number of opportunities and the corresponding determined number of occurrences.

7. The computer-implemented method of claim 6, wherein the second statistical analysis technique comprises using a specified number (Z) of Monte Carlo experiments, wherein in each Monte Carlo experiment the expected number of target event occurrences corresponding to a tested entity is replaced by a value sampled at random from an identified distribution, wherein for each Monte Carlo experiment a maximum score (Y) achieved by any entity is recorded, wherein the second score of a tested entity comprises a value indicative of a ratio of a number (L) of Monte Carlo experiments having a maximum score (Y) exceeding the first score of the tested entity to the specified number (Z) of Monte Carlo experiments.

8. The computer-implemented method of claim 7, wherein the specified probability distribution comprises one of a Poisson distribution or a Bernoulli model.

9. The computer-implemented method of claim 6, wherein the expected number of target event occurrences is computed using one of indirect standardization or a regression model.

10. The computer-implemented method of claim 6, wherein the transaction data further comprises at least one categorized value for at least one specified factor that corresponds to at least one event of the plurality of events, the computer-implemented method further comprising:
   taking the at least one categorized value into account when considering the corresponding target event for the corresponding entity, wherein the at least one specified factor of the at least one categorized value comprises at least one factor identified as influencing the corresponding target event.

11. The computer-implemented method of claim 1, wherein the plurality of entities comprises at least one of an employee, an employer, an approver, a person in management, an organizational unit, an organizational unit of a business, a department, a center, a division, an accounting division, a payment division, a geographical division, a subcontractor, a service provider and a supplier.

12. The computer-implemented method of claim 1, wherein the candidates for further investigation comprise candidates for at least one of an audit and a business control process.

13. A computer program product comprising program instructions embodied on a tangible computer-readable medium, execution of the program instructions resulting in operations comprising:
   providing transaction data comprising a plurality of pieces of information and an identification of a corresponding entity of a plurality of entities, wherein at least one piece of information of the plurality of pieces of information corresponds to each entity of the plurality of entities, wherein the plurality of pieces of information comprises a plurality of target values, wherein the transaction data comprises input data;
   determining a baseline comprising a set of target values over the plurality of entities excluding any target values considered to be significantly abnormal;
   computing at least one score for each entity of the plurality of entities by applying at least one statistical analysis technique to the input data, wherein the computed at least one score for a tested entity is indicative of at least one of a magnitude of deviation of the tested entity from a determined normal and repeated abnormal behavior of the tested entity, wherein computing the at least one score comprises computing a first score by applying a first statistical analysis technique, wherein computing the at least one score further comprises computing a second score by applying a second statistical analysis technique, wherein the first statistical analysis technique comprises a likelihood ratio test for a specified probability distribution, wherein the second statistical analysis technique comprises comparing the first score of the tested entity with corresponding first scores obtained from simulation experiments that assign target values to entities by randomly sampling the assigned target values from the baseline;
   selecting zero or more entities of the plurality of entities by comparing at least one computed score of each entity with a specified threshold, wherein the selected zero or more entities comprise candidates for further investigation; and
   ordering the selected zero or more entities based on at least one computed score of each entity of the selected zero or more entities.

14. The computer program product of claim 13, wherein the second statistical analysis technique comprises using a specified number (Z) of Monte Carlo experiments, wherein for each Monte Carlo experiment a maximum score (Y) achieved by any entity is recorded, wherein the second score of a tested entity comprises a value indicative of a ratio of a number (L) of Monte Carlo experiments having a maximum score (Y) exceeding the first score of the tested entity to the specified number (Z) of Monte Carlo experiments.

15. The computer program product of claim 13, wherein the plurality of pieces of information comprises a plurality of events, wherein execution of the program instructions results in operations further comprising:
   determining, for each entity of the plurality of entities, a number of opportunities for a target event in a specified time period based on the provided transaction data;
   determining, for each entity of the plurality of entities, a number of occurrences of the target event in the specified time period based on the provided transaction data; and
   computing, for each entity of the plurality of entities, an expected number of target event occurrences using the corresponding determined number of opportunities and the corresponding determined number of occurrences.

16. The computer program product of claim 15, wherein the second statistical analysis technique comprises using a specified number (Z) of Monte Carlo experiments, wherein in each Monte Carlo experiment the expected number of target event occurrences corresponding to a tested entity is replaced by a value sampled at random from an identified distribution, wherein for each Monte Carlo experiment a maximum score (Y) achieved by any entity is recorded, wherein the second score of a tested entity comprises a value indicative of a ratio of a number (L) of Monte Carlo experiments having a maximum score (Y) exceeding the first score of the tested entity to the specified number (Z) of Monte Carlo experiments.

17. A data processing device comprising:
an input configured to receive transaction data comprising a plurality of pieces of information and an identification of a corresponding entity of a plurality of entities, wherein at least one piece of information of the plurality of pieces of information corresponds to each entity of the plurality of entities, wherein the plurality of pieces of information comprises a plurality of target values, wherein the transaction data comprises input data;
a transaction processing unit configured to determine a baseline comprising a set of target values over the plurality of entities excluding any target values considered to be significantly abnormal, wherein the transaction processing unit is further configured to compute at least one score for each entity of the plurality of entities, to select zero or more entities by comparing at least one computed score of each entity with a specified threshold, and to order the selected zero or more entities based on at least one computed score of each entity of the selected zero or more entities; and
an output configured to output an ordered list of the selected zero or more entities,
wherein the at least one score is computed by applying at least one statistical analysis technique to the input data, wherein the computed at least one score for a tested entity is indicative of at least one of a magnitude of deviation of the tested entity from a determined normal and repeated abnormal behavior of the tested entity, wherein the transaction processing unit computing the at least one score comprises computing a first score by applying a first statistical analysis technique and computing a second score by applying a second statistical analysis technique, wherein the first statistical analysis technique comprises a likelihood ratio test for a specified probability distribution, wherein the second statistical analysis technique comprises comparing the first score of the tested entity with corresponding first scores obtained from simulation experiments that assign target values to entities by randomly sampling the assigned target values from the baseline, wherein the selected zero or more entities comprise candidates for further investigation.

18. The data processing device of claim 17, wherein the second statistical analysis technique comprises using a specified number (Z) of Monte Carlo experiments, wherein for each Monte Carlo experiment a maximum score (Y) achieved by any entity is recorded, wherein the second score of a tested entity comprises a value indicative of a ratio of a number (L) of Monte Carlo experiments having a maximum score (Y) exceeding the first score of the tested entity to the specified number (Z) of Monte Carlo experiments.

19. The data processing device of claim 17, wherein the plurality of pieces of information comprises a plurality of events, wherein the transaction processing unit is further configured to determine, for each entity of the plurality of entities, a number of opportunities for a target event in a specified time period based on the provided transaction data, to determine, for each entity of the plurality of entities, a number of occurrences of the target event in the specified time period based on the provided transaction data, and to compute, for each entity of the plurality of entities, an expected number of target event occurrences using the corresponding determined number of opportunities and the corresponding determined number of occurrences.

20. The data processing device of claim 19, wherein the second statistical analysis technique comprises using a specified number (Z) of Monte Carlo experiments, wherein in each Monte Carlo experiment the expected number of target event occurrences corresponding to a tested entity is replaced by a value sampled at random from an identified distribution, wherein for each Monte Carlo experiment a maximum score (Y) achieved by any entity is recorded, wherein the second score of a tested entity comprises a value indicative of a ratio of a number (L) of Monte Carlo experiments having a maximum score (Y) exceeding the first score of the tested entity to the specified number (Z) of Monte Carlo experiments.

21. The computer-implemented method of claim 1, wherein the second statistical analysis technique comprises using a specified number (Z) of Monte Carlo experiments, wherein for each Monte Carlo experiment a maximum score (Y) achieved by any entity is recorded, wherein the second score of a tested entity comprises a value indicative of a ratio of a number (L) of Monte Carlo experiments having a maximum score (Y) exceeding the first score of the tested entity to the specified number (Z) of Monte Carlo experiments.

* * * * *